United States Patent [19]

Obama

[11] Patent Number: 5,194,806

[45] Date of Patent: Mar. 16, 1993

[54] STRAIN SENSOR INCLUDING AN AMORPHOUS MAGNETIC METAL MEMBER, AND A METHOD OF PRODUCING THE STRAIN SENSOR

[75] Inventor: Masao Obama, Yokosuka, Japan

[73] Assignee: Kabushiki Kaisha Toshiba, Kawasaki, Japan

[21] Appl. No.: 712,061

[22] Filed: Jun. 7, 1991

[30] Foreign Application Priority Data

Jun. 7, 1990 [JP] Japan .................................. 2-147474

[51] Int. Cl.$^5$ .......................... G01B 7/24; G01L 1/12; H01C 17/28
[52] U.S. Cl. ..................................... 324/209; 23/779; 29/621.1
[58] Field of Search .......................... 324/209; 335/215; 73/779; 29/621.1

[56] References Cited

U.S. PATENT DOCUMENTS 3,638,153 11/1972 Sparrow ............................ 335/215
4,920,806 5/1990 Obama et al. .
4,931,729 6/1990 Pratt ................................. 324/209

FOREIGN PATENT DOCUMENTS 63-167203 7/1988 Japan .
1-311236 12/1989 Japan .
1-311237 12/1989 Japan .

Primary Examiner—Walter E. Snow

Attorney, Agent, or Firm—Oblon, Spivak, McClelland, Maier & Neustadt

[57] ABSTRACT

A strain sensor is formed by integrally stacking the following elements an amorphous magnetic metal layer (amorphous layer) having a reverse magnetostriction effect, two print sheets which are bonded to the upper and lower surfaces of the amorphous magnetic metal layer through insulating layers to form one coil, and an insulating layer arranged on a surface of the coil. This strain sensor is produced in the following steps the step of forming a first conducting pattern by arranging a plurality of first conductors on a first insulating layer to be substantially parallel to each other, the step of forming a second insulating layer on the first conducting pattern, the step of forming an amorphous magnetic metal layer having a reverse magnetostriction effect on the second insulating layer to cross the first conductors constituting the first conducting pattern, the step of forming a third insulating layer on the amorphous magnetic metal layer, the step of forming a second conducting pattern constituted by a plurality of second conductors on the third insulating layer to cross the amorphous magnetic metal layer and to connect the first conductors constituting the first conducting pattern in series with each other, thereby forming a coil spirally wound around the amorphous magnetic metal layer together with the first conductors, and the step of forming a fourth insulating layer on the second conducting pattern.

5 Claims, 5 Drawing Sheets

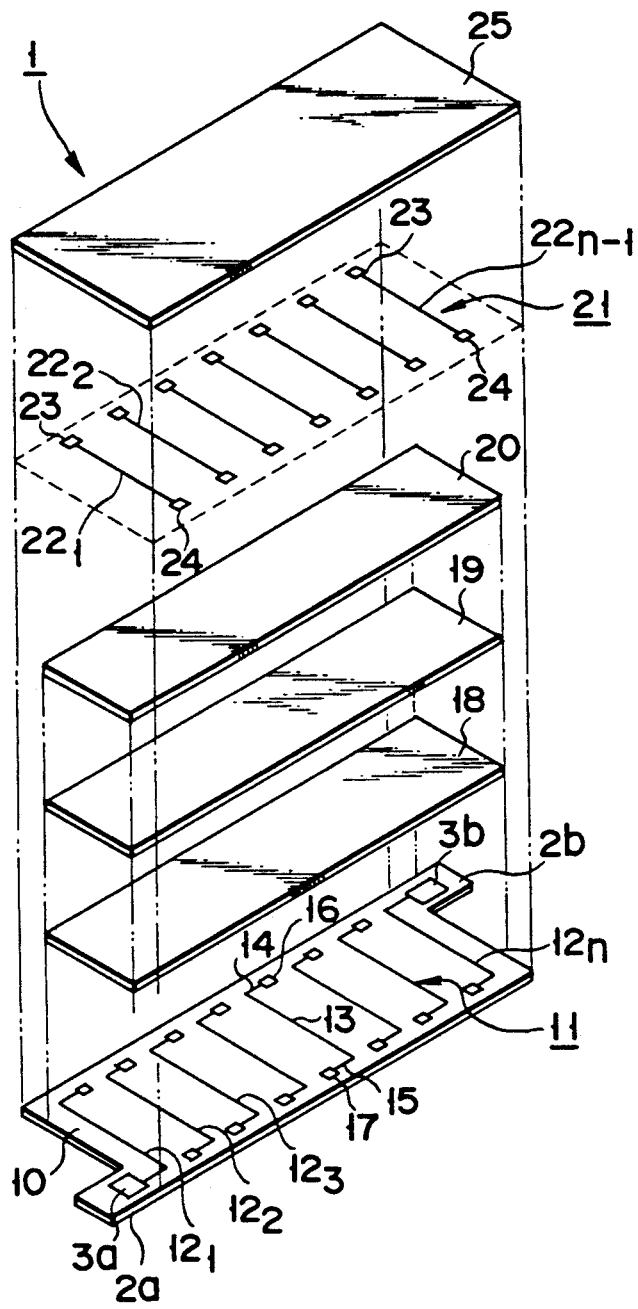
F I G. 2

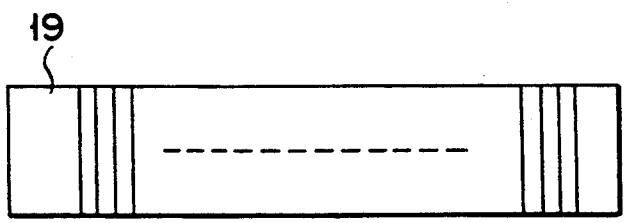
F I G. 3A
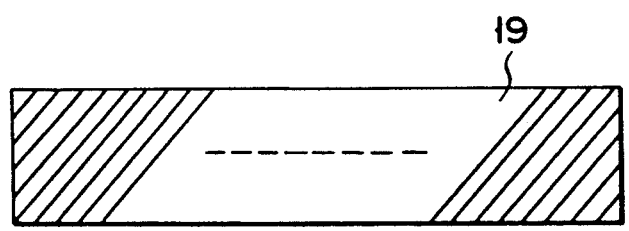
F I G. 3B

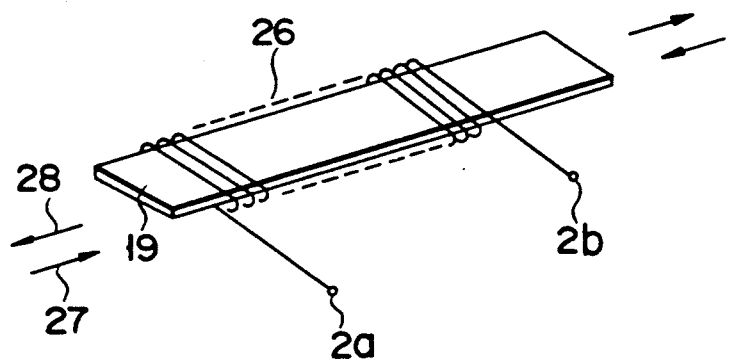
F I G. 4
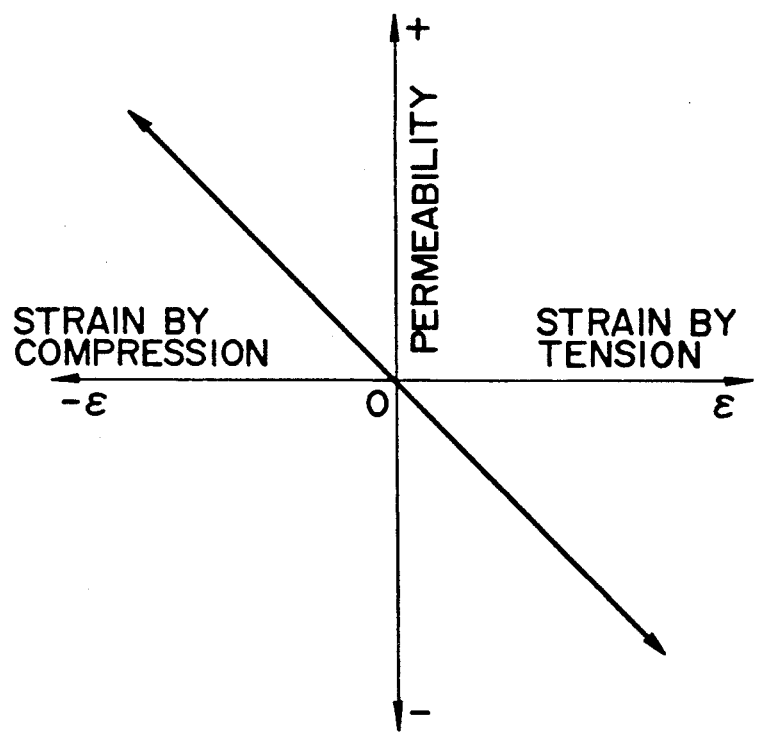
F I G. 5

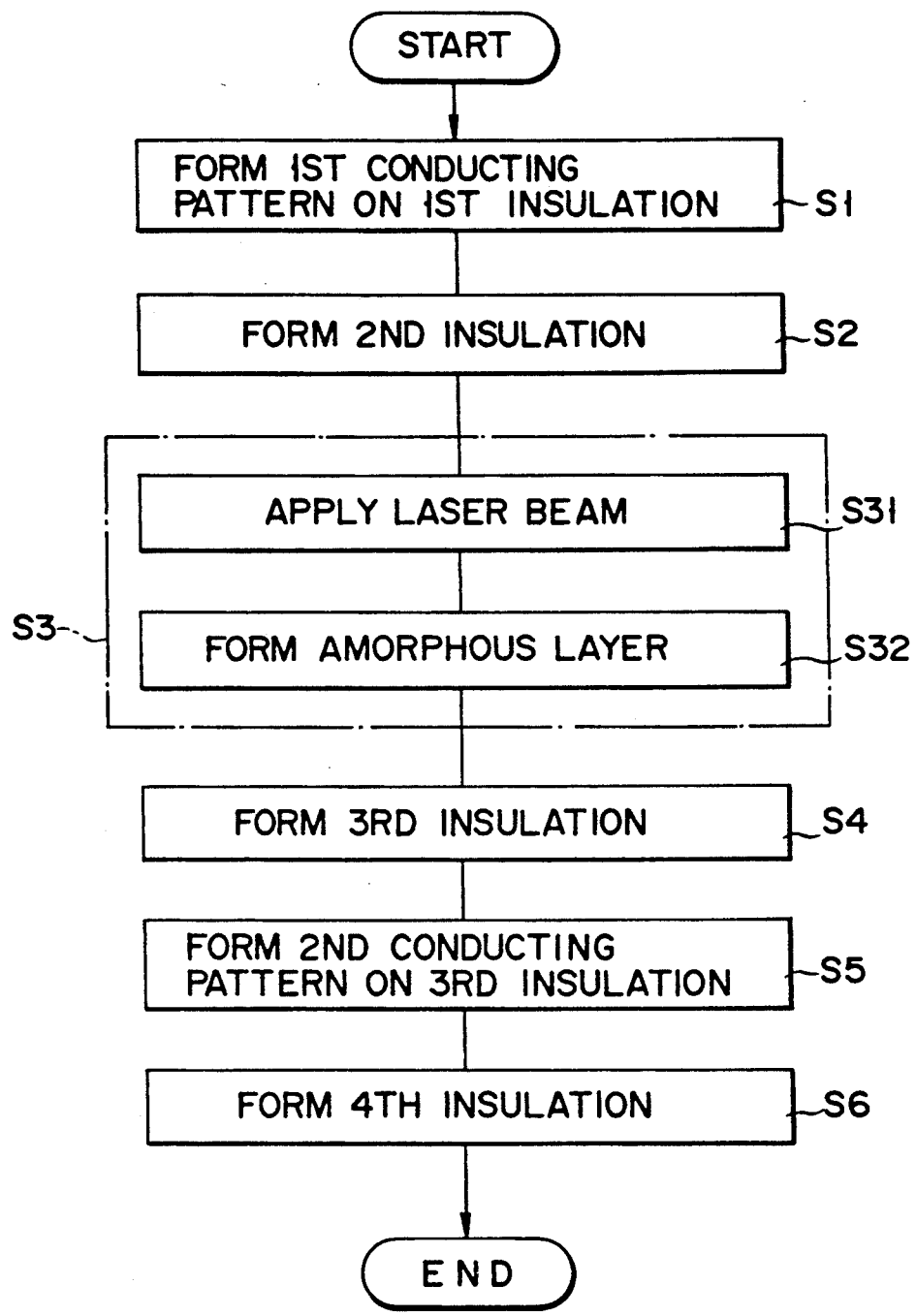
F I G. 6

STRAIN SENSOR INCLUDING AN AMORPHOUS MAGNETIC METAL MEMBER, AND A METHOD OF PRODUCING THE STRAIN SENSOR

BACKGROUND OF THE INVENTION

1. Field of the Invention

The present invention relates to a sensor (i.e. strain gage) for instantly detecting a small strain displacement and the producing method thereof.

2. Description of the Related Art

When a strain in a structural member is to be detected, a metal wire resistance strain gage whose resistance changes with respect to the strain is generally used.

This metal wire resistance strain gage is easy to handle and is highly reliable as compared with other types of sensors, and hence is widely used for measurement and detection. In general, however, the metal wire resistance strain gage has low detection sensitivity. For this reason, when the metal wire resistance strain gage is to be used for, e.g., load detection, driving force detection, or force detection for a robot or the like, the following scheme (i.e. measuring scheme) is employed to increase the level of a detected signal. In this scheme, a driving force transmitting member as a target to be detected is partially processed to have a portion in which the amount of strain is larger than that in other portions, i.e., a portion having lower mechanical rigidity, and a sensor of this type of strain gage is bonded to this portion. However, a reduction in rigidity of a driving force transmitting system of, e.g., a robot as a measurement target leads to a deterioration in response properties of the robot, and hence is not desirable. In addition, if an excessive force acts on a distal end portion of the robot, since the low-rigidity portion is greatly distorted, the sensor bonded to the portion may be distorted and destroyed permanently.

As a sensor having high sensitivity, a semiconductor strain sensor (gage) is known. Various limitations, however, are imposed on a sensor of this type in terms of handling. Therefore, this sensor is poor in versatility.

Under the circumstances, a strong demand has arisen for a strain sensor which is easy to handle and has high sensitivity and high reliability.

As described above, the conventional strain sensors cannot satisfy all the requirements, e.g., high sensitivity, easiness in handling, and high reliability.

SUMMARY OF THE INVENTION

It is an object of the present invention to provide a strain sensor which can satisfy all the requirements described above, has a simple structure, and can be easily produced, and the producing method thereof.

In order to achieve the above object, according to the present invention, there is provided a strain sensor comprising an amorphous magnetic metal layer (amorphous layer) having an inverse effect of magnetostriction, a coil wound around the amorphous magnetic metal layer through insulating layers, and an insulating layer arranged on a surface of the coil, wherein the respective constituting elements are integrally stacked on each other.

The strain sensor of the present invention is produced in the following steps: the step (S1) of forming a first conducting pattern by arranging a plurality of first conductors on a first insulating layer to be substantially parallel to each other, the step (S2) of forming a second insulating layer on the first conducting pattern, the step (S3) of forming an amorphous magnetic metal layer having a reverse magnetostriction effect on the second insulating layer to cross the first conductors constituting the first conducting pattern, the step (S4) of forming a third insulating layer on the amorphous magnetic metal layer, the step (S5) of forming a second conducting pattern constituted by a plurality of second conductors on the third insulating layer to cross the amorphous magnetic metal layer and to connect the first conductors constituting the first conducting pattern in series with each other, thereby forming a coil spirally wound around the amorphous magnetic metal layer together with the first conductors, and the step (S6) of forming a fourth insulating layer on the second conducting pattern.

This step sequence is performed by a combination of semiconductor producing techniques, sputtering, vapor deposition (i.e. vapolizing), and the like.

The permeability of an amorphous magnetic metal member having the reverse magnetostriction effect described above is greatly changed upon application of a tensile force or compressing force. In general, the permeability of the metal member is decreased upon application of a tensile force, but is increased upon application of a compressing force. In addition, if this amorphous magnetic metal member has magnetic anistropy, its permeability tends to be greatly changed.

The strain sensor according to the present invention is designed such that most of magnetic fluxes generated by the coil flow through the amorphous magnetic metal layer. For this reason, with a change in permeability of the amorphous magnetic metal layer due to tensile force or compressing force, the inductance value of the coil is greatly changed. If, therefore, a sensor of this type is bonded to a surface of a structural member with a bonding agent or the like, and a circuit is designed to detect the impedance value of the coil, a strain in the structural member, i.e., a load (degree) acting on the structural member, can be detected with high sensitivity on the basis of a change in impedance value.

Furthermore, in the method of producing the strain sensor of the present invention, since the sequence of producing steps is designed such that one spiral coil is formed in two processes, the already established techniques in the field of semiconductor production can be directly applied. Moreover, a small sensor having high sensitivity can be produced by the producing method of the present invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is an exploded perspective view showing the respective layers of the strain sensor;

FIGS. 3A and 3B are views for explaining a method of imparting magnetic anisotropy to an amorphous magnetic alloy layer incorporated in the strain sensor;

FIG. 4 is a perspective view illustrating the strain sensor.

FIG. 5 is a graph for explaining the magnetic characteristics of the amorphous magnetic alloy layer; and FIG. 6 is a flow chart showing the producing steps associated with a method of producing the strain sensor according to the present invention.

DETAILED DESCRIPTION OF THE PREFERRED EMBODIMENTS

Figure 1:
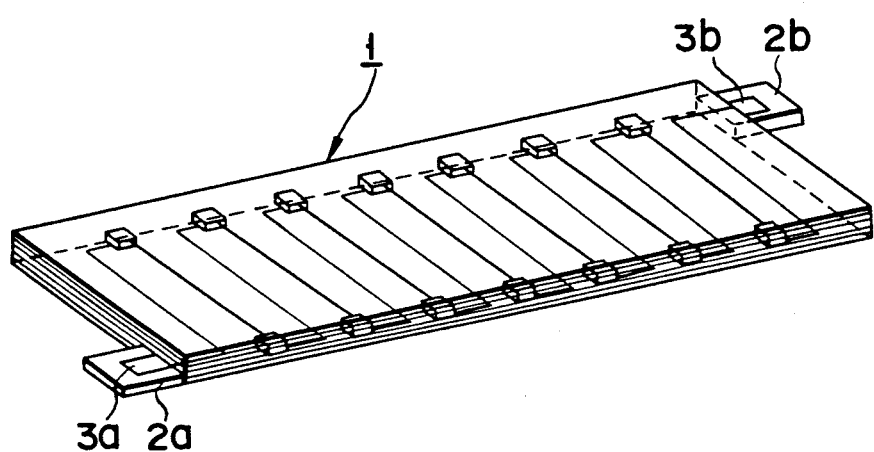
FIG. 1 is a perspective view showing an outer appearance of a strain sensor according to an embodiment of the present invention.

FIG. 1 shows an outer appearance (partially perspective view) of a sensor 1 according to an embodiment of the present invention. This strain sensor 1 is formed into a thin plate having a thickness of about 0.3 mm, a width of about 5 mm, and a length of about 15 mm. The strain sensor 1 is constituted by a plurality of thin films (as will be described in detail later) stacked on each other. As shown in FIG. 1, terminal portions 2a and 2b extend from two end portions of the sensor 1, located at diagonal positions, in its longitudinal direction. Connecting terminals 3a and 3b are arranged on these terminal portions 2a and 2b to be exposed, thus allowing external electrical connection.

FIG. 2 is an exploded perspective view showing the respective stacked layers constituting the strain sensor 1. In practice, the strain sensor 1 is produced by sequentially stacking necessary elements on each other by utilizing semiconductor producing techniques including vapor deposition, sputtering, and plating. However, FIG. 2 shows an exploded state of the respective stacked layers in order to facilitate understanding of the structure of the sensor 1.

Referring to FIG. 2, a substrate 10 is made of a elastic insulating material to have a substantially rectangular shape. Portions constituting the terminal portions 2a and 2b are integrally formed to extend in the longitudinal direction from the two end portions of the substrate 10, at the diagonal positions, in the longitudinal direction.

A first conducting pattern 11 constituted by a plurality of conductors is formed on the upper surface of the substrate 10. More specifically, the conducting pattern 11 is constituted by a plurality of conductors $12_1, 12_2, \ldots, 12_n$ arranged at equal intervals in the longitudinal direction of the substrate 10. Each of these conductors $12_1, 12_2, \ldots, 12_n$ is formed to have a width of about 0.1 mm and a thickness of about 0.05 mm, and is constituted by a portion 13 (of each conductor of the conducting pattern 11) extending in a direction perpendicular to the longitudinal direction of the substrate 10, and portions 14 and 15 extending, in opposite directions, from two end portions of the portion 13 in the longitudinal direction of the substrate 10. In addition, connecting portions 16 and 17, each having larger width and thickness than the end portions 14 and 15, are respectively formed at the distal end portions of the end portions 14 and 15 (of each conductor of the conducting pattern 11). Note that the end portion 15 of the conductor $12_1$ located at one end of the substrate 10 in the longitudinal direction extends onto the terminal portion 2a, and the distal end portion of the end portion 15 is connected to the terminal 3a. Similarly, the portion 14 of the conductor $12_n$ located at the other end of the substrate 10 in the longitudinal direction extends onto the terminal portion 2b, and the distal end portion of the portion 14 is connected to the terminal 3b.

An insulating layer 18 is formed on the first conducting pattern 11. This insulating layer 18 is formed to have a proper length and width to cover the upper surface of the first conducting pattern 11 except for the connecting portions 16 and 17 of the conductors $12_1, 12_2, \ldots, 12_n$ constituting the first conducting pattern 11.

In addition, a plate-like amorphous magnetic alloy layer 19 having a length and a width slightly smaller than those of the insulating layer 18 is formed on the insulating layer 18. The amorphous magnetic alloy layer 19 consists of, e.g., a material having a composition of Co (85 wt %), Zr (10 wt %), and Fe (5 wt %). As shown in FIG. 3A, the upper surface of the amorphous magnetic alloy layer 19 is irradiated with a laser beam (i.e., a carbon dioxide gas laser), in the direction of the width of the layer 19 at equal intervals in the longitudinal direction. With this laser beam irradiation, magnetic anisotropy is imparted (to the amorphous magnetic alloy layer). The portions, of the layer 19, irradiated with the laser beam are heated, and their magnetic characteristics are changed. As a result, the amorphous magnetic alloy layer 19 has magnetic characteristics represented by a fringe-like distribution in the longitudinal direction, and magnetic anisotropy in the direction of width.

An insulating layer 20 having substantially the same length and width as those of the insulating layer 18 is formed on the amorphous magnetic alloy layer 19.

Furthermore, a second conducting pattern 21 is formed on the insulating layer 20 and the substrate 10. The second conducting pattern 21 is constituted by $(n-1)$ conductors $22_1, 22_2, \ldots, 22_{n-1}$ formed at equal intervals in the longitudinal direction of the insulating layer 20. Each of these conductors $22_1, 22_2, \ldots, 22_{n-1}$ is formed to have substantially the same length and width as those of each of the conductors constituting the first conducting pattern 11. Connecting portions 23 and 24 are formed at the two end portions of each of the conductors $22_1, 22_2, \ldots, 22_{n-1}$. More specifically, the connecting portions 23 and 24 formed at the two end portions of each of the conductors $22_1, 22_2, \ldots, 22_{n-1}$ are respectively connected to the connecting portions 16 and 17 of each of the conductors $21_1, 22_2, \ldots, 22_{n-1}$ constituting the first conducting pattern 11 to connect the conductors $12_1, 12_2, \ldots, 12_n$ in series with each other, thus forming a coil spirally wound around the amorphous magnetic alloy layer 19. Moreover, an insulating layer 25 is formed on the second conducting pattern 21.

As illustrated by FIG. 4, the strain sensor 1 is designed such that a coil 26 constituted by the conductors $12_1, 12_2, \ldots, 12_n$, and $22_1, 22_2, \ldots, 22_{n-1}$ is wound around the amorphous magnetic alloy layer 19 through the insulating layers 18 and 20, and the coil 26 is covered with the substrate 10 and the insulating layer 25 (not shown). That is, the strain sensor 1 is formed by integrally stacking these layers on each other so as to have a stacked-layer structure. Similar to a metal resistive line type strain sensor or the like, the strain sensor 1 having the above-described arrangement is bonded to a surface of a structural member (to be measured). The amount of strain in the structural member is then detected from an inductance value generated by the coil 26.

In the above-described arrangement, as indicated by solid arrows 27 and 28 in FIG. 4, when a compression or tension acts on the amorphous magnetic alloy layer 19, the permeability of the layer 19 is changed in the manner indicated by the graph in FIG. 5. In this case, since the amorphous magnetic alloy layer 19 penetrates through the coil 26, a change in permeability of the amorphous magnetic alloy layer 19 due to compression or tensile strength appears as a change in inductance of the coil 26. Therefore, on the basis of the change in inductance value, the amount of strain, i.e., force acting on the structural member, can be detected. The strain sensor 1 has detection sensitivity as high as 50 to 150 times that of a metal resistive line type strain sensor.

In an experiment conducted by the present inventor, an amorphous magnetic alloy layer (amorphous layer) having a thickness of 30 μm, a width of 4 mm, and a length of 15 mm was used, and a strain of $400 \times 10^{-6}$ was applied to a strain sensor, which was obtained by bonding thin films (i.e. print films) to the upper and lower surfaces of the amorphous layer to form a coil by using the technique of stacking layers shown in FIG. 2, in order to check a change in inductance value. In this experiment, a change of 10% or more was detected. This actual measurement value is equivalent to a gage factor of 250 or more in, e.g., a metal resistive line type strain sensor. That is, it is confirmed that the strain sensor of the present invention can detect a strain with much higher sensitivity than a metal resistive line type strain sensor, which generally has a gage factor of about 2.

In the above embodiment, magnetic anisotropy is imparted to the amorphous magnetic alloy layer by radiating a laser beam on the layer in the direction of width at equal intervals in the longitudinal direction. As shown in FIG. 3B, however, oblique magnetic anisotropy may be imparted to the amorphous magnetic alloy layer by radiating a laser beam on the layer obliquely in the direction of width at equal intervals in the longitudinal direction.

There is also another method of imparting oblique magnetic anisotropy to the amorphous magnetic alloy layer. For example, field induced magnetic anisotropy performing a heating procedure in direct current magnetic field after above mentioned process steps.

FIG. 6 is a flow chart showing the producing steps of the producing method according to the present invention.

This method is characterized in that the coil, which is a characteristic feature of the structure of the strain sensor of the present invention, is formed in two processes. More specifically, the basic processes of the producing method include processing each of layers of the strain sensor, which constitute a stacked-layer structure, and sequentially stacking the processed layers on each other. A sequence of steps, as an example, will be described below in accordance with the flow chart in FIG. 6:

(S1) the step of forming a first conducting pattern (print sheet), which has a plurality of first conductors arranged (printed) to be substantially parallel to each other, on a first insulating layer having a predetermined size;

(S2) the step of forming a second insulating layer having a size smaller than the predetermined size on the first conducting pattern;

(S3) the step of irradiating an amorphous magnetic metal layer with a laser beam at predetermined intervals to impart magnetic anisotropy to the layer, and forming the amorphous magnetic metal layer having a reverse magnetostriction effect on the second insulating layer so as to cross the first conductors constituting the first conducting pattern;

(S4) the step of forming a third insulating layer on the amorphous magnetic metal layer to have the same size (a predetermined size) as that of the second insulating layer;

(S5) the step of forming a second conducting pattern (print sheet), which is constituted by a plurality of second conductors, each having a width slightly smaller than that of the third insulating layer, printed at predetermined intervals in the longitudinal direction, on the third insulating layer to cross the amorphous magnetic metal layer and to connect the first conductors constituting the first conducting pattern in series with each other, thereby forming a coil spirally wound around the amorphous magnetic metal layer together with the first conductors;

(S6) the step of forming a fourth insulating layer on the second conducting pattern; and (S7) the step of connecting corresponding upper and lower connecting portions of the first and second conducting patterns (print sheets) to each other under pressure by vapor deposition to form the coil spirally wound around the second and third insulating layers and the amorphous magnetic metal layer.

According to the sequence of the producing steps (procedures) of the present invention, as a method of forming a spirally wound coil, after the first and second conducting patterns (print sheets) are independently formed in the two steps, i.e., steps S1 and S5, and undergo the stacking step, the corresponding end portions of the upper and lower conducting patterns are connected to each other under pressure, thereby easily forming one coil spirally wound around the amorphous magnetic metal layer sandwiched between the second and third insulating layers. In addition, by irradiating the upper surface of the amorphous magnetic metal layer with a laser beam in advance to impart magnetic anisotropy to the layer, a strain sensor exhibiting a great change in permeability can be obtained.

As has been described above, according to the present invention, a small, high-sensitivity strain sensor can be provided without a complicated structure.

In addition, according to the producing method of the strain sensor of the present invention, since the producing procedures are designed to form one spiral coil in two processes, the production of a strain sensor can be facilitated by applying the already established producing techniques.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims an their equivalents.

What is claimed is:

1. A strain sensor comprising:
    an amorphous magnetic metal layer having reverse magnetostriction effect;

a plurality of insulating layers arranged on upper and lower surfaces of said amorphous magnetic metal layer; and a coil arranged through said insulating layers, wherein said elements are integrated;

wherein said amorphous magnetic metal layer defines a longitudinal axis and has magnetic characteristics represented by a fringe-like distribution along the longitudinal axis and a magnetic anisotropy in a direction perpendicular to the longitudinal axis.

2. A strain sensor comprising:

an amorphous magnetic metal layer having a reverse magnetostriction effect;

first and second insulating layers stacked on upper and lower surfaces of said amorphous magnetic metal layer;

a first conducting print pattern formed on a surface of said amorphous magnetic metal layer through said first insulating layer; and a second conducting print pattern arranged on surface of said amorphous magnetic metal layer through said second insulating layer, wherein predetermined end portions of said first and second conducting print patterns are connected to each other to form one coil;

wherein said amorphous magnetic metal layer defines a longitudinal axis and has magnetic characteristics represented by a fringe-like distribution along the longitudinal axis and a magnetic anisotropy in a direction perpendicular to the longitudinal axis.

3. A strain sensor comprising:

an amorphous magnetic metal layer having reverse magnetostriction effect;

a plurality of insulating layers arranged on upper and lower surfaces of said amorphous magnetic metal layer; and a coil arranged through said insulating layers, wherein said elements are integrated;

wherein said amorphous magnetic metal layer defines a longitudinal axis and exhibits oblique magnetic anisotropy in relation to the longitudinal axis.

4. A strain sensor comprising:

an amorphous magnetic metal layer having a reverse magnetostriction effect;

first and second insulating layers stacked on upper and lower surfaces of said amorphous magnetic metal layer;

a first conducting print pattern formed on a surface of said amorphous magnetic metal layer through said first insulating layer; and a second conducting print pattern arranged on surface of said amorphous magnetic metal layer through said second insulating layer, wherein predetermined end portions of said first and second conducting print patterns are connected to each other to form one coil;

wherein said amorphous magnetic metal layer defines a longitudinal axis and exhibits oblique magnetic anisotropy in relation to the longitudinal axis.

5. A method of producing a strain sensor, comprising:

the step of forming a first conducting pattern by arranging a plurality of first conductors on a first insulating layer to be substantially parallel to each other;

the step of forming a second insulating layer on said first conducting pattern;

the step of forming an amorphous magnetic metal layer having a reverse magnetostriction effect on said second insulating layer to cross said first conductors constituting said first conducting pattern;

the step of forming a third insulating layer on said amorphous magnetic metal layer;

the step of forming a second conducting pattern constituted by a plurality of second conductors on said third insulating layer to cross said amorphous magnetic metal layer and to connect said first conductors constituting said first conducting pattern in series with each other, thereby forming a coil spirally wound around said amorphous magnetic metal layer together with said first conductors; and the step of forming a fourth insulating layer on said second conducting pattern;

wherein the step of forming said amorphous magnetic metal layer includes the magnetic anisotropy processing step of selectively irradiating portions of said amorphous magnetic metal layer with a heating energy beam in a direction of width of said layer (i.e., a direction perpendicular or approximately perpendicular to a longitudinal direction of said layer).

* * * * *